US009434884B2

(12) United States Patent
Lubnin et al.

(10) Patent No.: US 9,434,884 B2
(45) Date of Patent: Sep. 6, 2016

(54) FLAME-RETARDING OLIGOMERIC BROMINATED URETHANE COMPOSITIONS

(75) Inventors: Alexander V. Lubnin, Copley, OH (US); Ti Chou, Bay Village, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 91 days.

(21) Appl. No.: 13/881,954

(22) PCT Filed: Oct. 28, 2011

(86) PCT No.: PCT/US2011/058288
§ 371 (c)(1),
(2), (4) Date: Apr. 26, 2013

(87) PCT Pub. No.: WO2012/058538
PCT Pub. Date: May 3, 2012

(65) Prior Publication Data
US 2013/0217286 A1 Aug. 22, 2013

Related U.S. Application Data

(60) Provisional application No. 61/408,102, filed on Oct. 29, 2010.

(51) Int. Cl.
*C09K 21/14* (2006.01)
*C08G 18/08* (2006.01)
*C08G 18/10* (2006.01)
(Continued)

(52) U.S. Cl.
CPC ............ *C09K 21/14* (2013.01); *C08G 18/0823* (2013.01); *C08G 18/10* (2013.01); *C08G 18/2885* (2013.01);
(Continued)

(58) Field of Classification Search
CPC .. C08G 18/2885; C08G 18/00; C08G 18/28; C08G 18/0823; C08G 18/122; C08G 18/4238; C08G 18/6692; C08G 18/755; C08G 18/3231; C09K 21/14; Y10T 428/31993; Y10T 442/2713
See application file for complete search history.

(56) References Cited

U.S. PATENT DOCUMENTS 4,052,346 A * 10/1977 Rudner et al. ................ 521/112
2002/0143139 A1* 10/2002 Chen et al. .................... 528/354
(Continued)

FOREIGN PATENT DOCUMENTS

EP 0274908 A2 * 7/1988 ......... C08G 18/0823
EP 0757068 A1 2/1997
(Continued)

OTHER PUBLICATIONS

Written Opinion of International Searching Authority PCT/US2011/058288.
(Continued)

*Primary Examiner* — Jeremy R Pierce
(74) *Attorney, Agent, or Firm* — Samuel B. Laferty; Teresan W. Gilbert

(57) ABSTRACT

The flame-retarding properties of polymeric compositions are selectively enhanced, without adversely affecting other properties of these materials to any significant degree, by including in the compositions oligomeric urethanes with high bromine content.

17 Claims, 2 Drawing Sheets

(51) Int. Cl.
  *C08G 18/28* (2006.01)
  *C08G 18/32* (2006.01)
  *C08G 18/34* (2006.01)
  *C08G 18/38* (2006.01)
  *C08G 18/72* (2006.01)
  *C08G 18/73* (2006.01)
  *C08G 18/75* (2006.01)
  *C08K 5/00* (2006.01)
  *C08K 5/05* (2006.01)
(52) U.S. Cl.
  CPC ....... *C08G 18/3206* (2013.01); *C08G 18/348* (2013.01); *C08G 18/381* (2013.01); *C08G 18/722* (2013.01); *C08G 18/73* (2013.01); *C08G 18/755* (2013.01); *C08K5/0066* (2013.01); *C08K 5/05* (2013.01); *Y10T 428/31993* (2015.04); *Y10T 442/2713* (2015.04)

(56) References Cited

U.S. PATENT DOCUMENTS

| 2005/0004306 | A1* | 1/2005 | Lubnin et al. | 524/589 |
| 2007/0270537 | A1* | 11/2007 | Suzuki | C08L 75/04 524/481 |
| 2010/0040792 | A1 | 2/2010 | Keshavaraj et al. | |

FOREIGN PATENT DOCUMENTS

| GB | 1459623 A | 12/1976 |
| WO | 02077061 A1 | 10/2002 |

OTHER PUBLICATIONS

WPI XPI002669435.
WPI XP00266946.

\* cited by examiner

FLAME-RETARDING OLIGOMERIC BROMINATED URETHANE COMPOSITIONS

FIELD OF INVENTION

The invention relates to the composition and manufacture of highly halogenated flame-retarding oligomeric urethanes. Such dispersions are useful in various applications, including paper, nonwoven, textile and fiber glass sizing and coatings, automotive, adhesive, packaging and coatings applications, medical, personal care and household care items.

BACKGROUND

Flame retarding (FR) applications often rely on the use of brominated FR additives. Some of them, such as decabromodiphenyl ether ("decabrom"), hexabromocyclododecane, 2-ethylhexyl tetrabromobenzoate (TBB), bis-(2-ethylhexyl)-tetrabromophthalate (BEHTBP), 1,2-bis-(2,4,6-tribromophenoxy)-ethane (BTBPE) and tribromophenol (TBP), are fugitive. They leach out of the products and accumulate in environment posing probable risk to the nature and humans. Production of several of them, such as decabrom, will be discontinued in the next few years and others will be extensively monitored. The challenge is to compensate their loss in existing applications.

US20100040792A1 "Airbag with flame retardant monolithic coating layer" discloses coating compositions, to be used as coating for airbags. These compositions are comprised of urethanes, which are blended together, where one urethane is inherently flame retardant and the other has gas-retaining properties. Unspecified commercially available FR products from Stahl and Hauthaway which contain brominated polyol were used. US20100040792A1 contains no teaching on the use of halogenated monofunctional monomers.

SUMMARY OF INVENTION

In accordance with this invention, it has been found that the flame-retarding properties of polymeric compositions are enhanced, unexpectedly without adversely affecting other properties of these materials to any significant degree, by including in the compositions oligomeric urethanes with high bromine content. Thus, this invention provides oligomeric urethanes with high bromine content and their mixtures with other polymers.

Surprisingly, the objects of the present invention were also found to impart good mechanical properties when used alone as a binder or sizing agent for paper despite their relatively low molecular weights.

In addition, this invention further provides a colloidally stable aqueous dispersion comprising water and oligomeric urethanes with high bromine content.

In addition, this invention further provides processes for making such an aqueous dispersion.

DETAILED DESCRIPTION

Definitions

Figure 1:
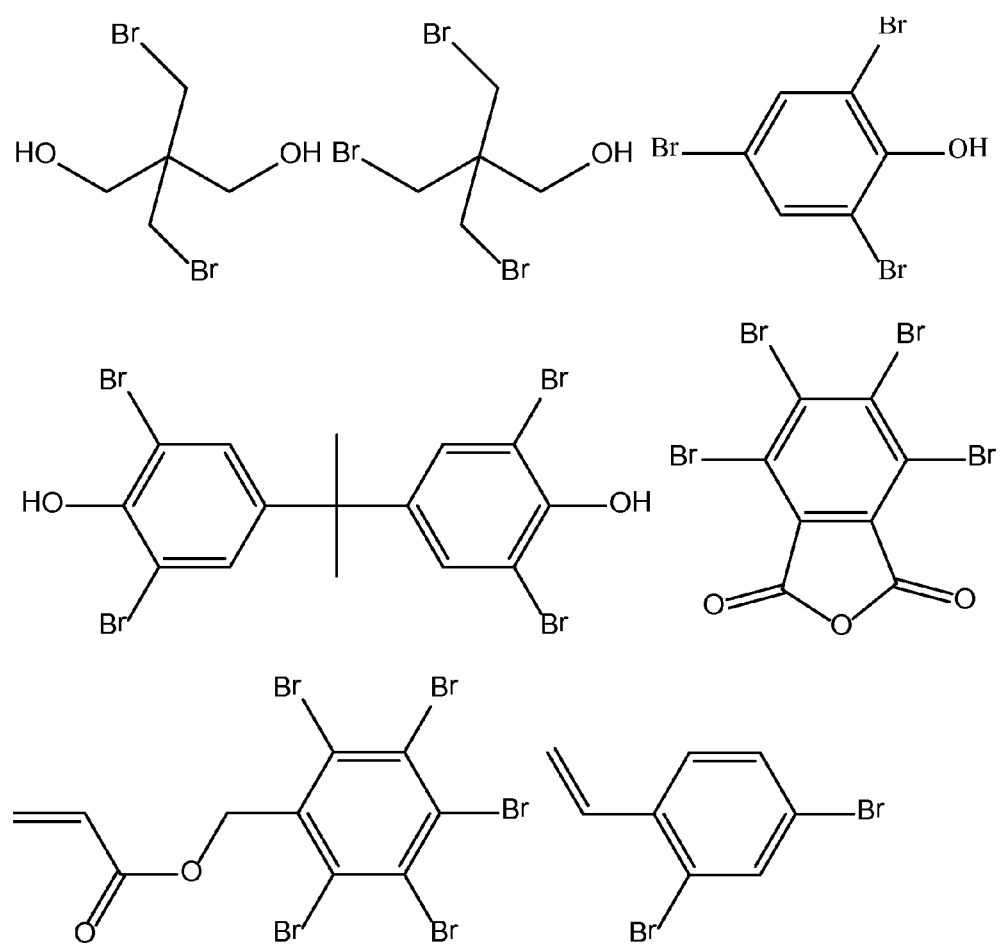
FIG. 1 shows various brominated monomers useful in the compositions of the present invention.

The following terms have definitions as stated below:

Polyurethane is a term used to describe polymers including oligomers (e.g., prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocynaurate, uretdione, ester, ether, carbonate, hydrocarbon, fluorocarbon, alcohol, mercaptan, amine, hydrazide, siloxane, silane, ketone, olefin, etc., in addition to urethane groups.

Final polyurethane product refers to the form of the polyurethane in the aqueous dispersion product of this invention. Where the polyurethane prepolymer is optionally chain extended, the final polyurethane product is this chain extended polymer. Where the polyurethane prepolymer is not chain extended, the final polyurethane product is the prepolymer itself.

Weight % means the number of parts by weight of ingredient per 100 parts by weight of composition or material (often per 100 parts by weight of urethane polymer or oligomer) of which the ingredient forms a part. All units will be in weight % unless otherwise stated.

Aqueous describes a composition containing a substantial amount of water. Preferably aqueous will mean at least 20 wt. % water, and in a more preferred embodiment, it will be at least 50 wt. % water based on water and other solvents. It may contain other ingredients such as compatible organic solvents as well. Thus, if we say aqueous polyurethane dispersion (PUD), we will mean in a preferred embodiment that the polyurethane is dispersed in a liquid media that is at least 20 wt. % water and can contain compatible organic materials such as alcohol and other polar organic solvents.

Substantial absence of water refers to compositions formed without the intentional addition of any significant amount of water, e.g., about 2 wt. % or less or so based on the total weight of the composition. Typically, the reaction of isocyanates with polyols is conducted in the substantial absence of water as water can separately react with isocyanates to form less desirable and less controlled structures.

Substantial absence of surfactant means that the dispersion is made without intentionally including any significant amount of surfactant (often defined as surface active species of less than 200 Mn) for suspending or dispersing the dispersed phase of the dispersion. This often occurs when we have sufficient tethered tertiary amino groups and/or nonionic dispersants attached to the polyurethane backbone to allow the polyurethane to be self-dispersible in water.

Acid number is the mass of potassium hydroxide (KOH) in milligrams that is required to neutralize one gram of chemical substance. The acid number can be used as a measure of the amount of carboxylic acid groups in a polymer and is expressed in mgKOH/gram.

Theoretical bromine content refers to weight % of bromine in the urethane and is calculated based on the known content of bromine in starting materials. Plasticizers and volatile neutralizing agents, when present, are not included in the calculations.

Number-average molecular weight is the ordinary arithmetic mean or average of the molecular weights of the individual macromolecules. It is determined by measuring the molecular weight of n polymer molecules, summing the weights, and dividing by n:

$$M_n = \Sigma(n_i * M_i)/\Sigma n_i$$

In the art of making thermoplastic polyurethanes, the vast majority of used monomers is difunctional or close to difunctional. This is required for the development of high molecular weight of the polymer formed by step-growth polymerization formerly known as polycondensation. The high molecular weight is a prerequisite for good mechanical properties of the thermoplastic polymers. Monofunctional and greater than difunctional monomers can be used but their levels is generally limited to single digits of percent—usually less than 5% wt. If high levels of trifunctional monomers are used, then a highly branched and crosslinked polymers are formed which behave more like thermosets rather than thermoplastic. High levels of monofunctional monomers severely reduce molecular weight often to below entanglement molecular weight and the resulting polymer can not exhibit good mechanical properties.

The surprising aspect of this invention is that the use of monofunctional highly brominated monomers in making oligomeric urethane compositions, while indeed drastically reduces the molecular weight, still produces binders for paper with resulting excellent mechanical properties and at the same time increases the level of bromine needed for the FR properties.

Another aspect of the present invention is an unexpected discovery that these highly brominated urethane oligomers improve the flame-retarding properties of other polymeric compositions without significantly detracting from other performance characteristics of those other polymers.

There are two main routes for making highly halogenated oligomeric urethanes:

Use monofunctional NCO-reactive monomers and isocyanates. These monofunctional monomers can also be highly halogenated in addition to other highly halogenated monomers.

Use stoichimetric excess of difunctional monomers over isocyanates. Highly halogenated monomers cab be these difunctional monomers or separate monomers.

Urethanes

Urethanes of this invention are formed from at least one polyisocyanates and at least one NCO-reactive compound.

Any compound that provides a source of active hydrogen for reacting with isocyanate groups via the following reaction: —NCO+H—X→—NH—C(=O)—X, can be used as the NCO-reactive compound in this invention. Examples include, but are not limited to, polyols, polythiols and polyamines.

Isocyanates

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred. Monoisocyanates can be used as an alternative or complementary tool for controlling the molecular weight of polyurethane oligomers.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, lysine diisocyanate and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, isophorone diisocyanate, cyclohexane diisocyanate, bis-(isocyanatomethyl) cyclohexane, methylcyclohexane diisocyanate, cyclohexane triisocyanate, their isomers and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include diphenylmethylene diisocyanate, toluene diisocyanate, phenylene diisocyanate, naphthalene diisocyanate, tetrahydronaphthalene diisocyanate, biphenylene diisocyanate, dimethyl biphenylene diisocyanate, dichloro biphenylene diisocyanate, triphenyl methane triisocyanate, their isomers, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Dimers, trimers and oligomers of the above mentioned isocyanates may also be used. Examples include polymeric MDI.

Examples of suitable monofunctional isocyanates include methyl isocyanate, ethyl isocyanate, propyl isocyanate, isopropyl isocyanate, butyl isocyanate, tert-butyl isocyanate, n-octylisocyanate, 2-chloroethyl isocyanate, phenyl isocyanate, 4-tolyl isocyanate, chlorophenyl isocyanate, 4-cyanophenyl isocyanate, 3,5-dinitrophenyl isocyanate, 2,4,6-tribromophenyl isocyanate, phenylethyl isocyanate, alpha-methylbenzyl isocyanate, 1-methyl-2-phenylethyl isocyanate, N-(1-methyl-3,3-diphenylpropyl)-isocyanate, alpha-naphthyl isocyanate, 2-naphthyl isocyanate, 1-(1-naphthyl)ethyl isocyanate, diethoxyphosphoryl isocyanate, 7-methyl-indole ethyl isothiocyanate, 2'-deoxy-2'-isocyano-1-arabinofuranosylcytosine, isocyanatomethacrylate, acryloyl isocyanate, allyl isocyanate, 2-isocyanatoethyl methacrylate, methyl alpha-isocyanatoacrylate, 3-isocyanatoacrylonitrile, 3-isopropenyl-alpha,alpha-dimethylbenzyl isocyanate (TMI® from Cytec), 2-isocyanatoethyl propionate, 3-(triethoxysilyl)-propylisocyanate, 3-isocyanatopropyl trimethoxysilane, chloroacetyl isocyanate, trichloroacetyl isocyanate, chlorosulfonyl isocyanate, diethyl (1-isocyanatoethyl)-phosphonate, N-chlorosulfonyl isocyanate, flunoxaprofen isocyanate, isocyanato-(trimethylamino)-octahydrodecaborate, isocyanatoundecahydrododecaborate, and isocyanates disclosed in U.S. Pat. No. 3,899,387, U.S. Pat. No. 4,510,097, U.S. Pat. No. 4,788,329 the disclosure of which is incorporated herein by reference.

Isocyanates can be used alone or in combination of two or more.

NCO:OH Ratio

When the prepolymer produced in the present invention is isocyanate-terminated, the ratio of isocyanate equivalents to active hydrogen in the prepolymer typically have lower limits of about 1.3/1 or more, desirably 1.5/1 or more, and preferably 1.7/1 or more and upper limits of about 2.5/1 or less, desirably about 2.1/1 or less, and preferably about 2/1 or less.

When a close to stoichiometric ratio of NCO:OH is preferred, e.g. in a thermoplastic polyurethane or in a prepolymer where molecular weight of the reaction product is limited by a monofunctional reactant, then an NCO:OH ratio from about 0.90/1 or 0.95/1 to about 1.3/1 or <1.3/1 is preferred.

Monofunctional Halogenated Monomers

A class of monofunctional halogenated alkyl monomers is represented by the formula (I):

where n=1 to 22; x<2n+2; Hal=F, Cl, Br, I; Z=O, NH, S and —(CHX—CHY—O)$_m$—; m=1 to 100; X and Y are independently H, $CH_3$, $C_2H_5$, $C_6H_5$, or Hal. Example of such a monofuctional monomer is tribromoneopentanol.

Another class is monofunctional halogenated aromatic monomers which can be represented by the formula (II):

where y<6.

Example of halogenated aromatic monofuctional monomers are tribromophenol and pentabromophenol.

The third class is halogenated alkyl aromatic monofunctional monomers. They can be represented by formula (II) in which one or more Hal or H are replaced with $C_nHal_xH_{(2n+1-x)}$ from formula (I).

Thus, in one embodiment of the present invention, to achieve a good balance of physical and FR properties of the urethane oligomers as a binder, the content of halogenated monofunctional monomer in the final oligomeric urethane is at least 10%, preferably at least 15%. A more preferred content is at least 20% and the most preferred content is at least 25%. For such a monomer as tribromoneopentanol, it is possible to incorporate it into a trimer with HDI at up to about 90% wt based on the dry weight of the urethane.

Difunctional Halogenated Monomers

A class of difunctional aliphatic halogenated monomers is represented by the formula (III):

Example of aliphatic difunctional halogenated monomers is dibromoneopentane glycol.

Example of aromatic difunctional halogenated monomers is tetrabromobisphenol-A.

When access of difunctional NCO-reactive monomers over isocyanate monomer is used to control the molecular weight, the NCO:OH equivalent ratio should be less than 0.95, preferably less than 0.9.

Thus, in one embodiment of the present invention, to achieve a good balance of physical and FR properties of the urethane oligomers as a binder, the content of halogenated difunctional monomer in the final oligomeric urethane is at least 10%, preferably at least 15%. A more preferred content is at least 20% and the most preferred content is at least 25%. For such a monomer as dibromoneopentane glycol, it is possible to incorporate it into a trimer with HDI at up to about 75% wt. based on the dry weight of the urethane.

Molecular Weight of Highly Halogenated Oligomeric Urethanes

The use of monofunctional monomers and/or NCO:OH ratio of less than 1 result in the formation of relatively low molecular weight urethane oligomers. The number-average molecular weight of the urethane oligomers of the present invention is at least 800 g/mol, preferably at least 1,000 g/mol. A more preferred molecular weight is at least 1,200 g/mol and the most preferred is at least 1,400 g/mol. The number-average molecular weight does not exceed 20,000 g/mol and preferably is less than 15,000 g/mol. A more preferred molecular weight is less than 10,000 g/mol and the most preferred is less than 5,000 g/mol.

The low molecular weights lead to low physical properties of neat oligomers (elongation of less than 100% and ultimate tensile of less than 1,000 psi) but surprisingly they still make a good FR binder for fibers.

Water-Dispersability Enhancing Compounds

Polyurethanes are generally hydrophobic and not water-dispersible. Therefore, at least one water-dispersability enhancing compound (i.e., monomer), which has at least one, hydrophilic, ionic or potentially ionic group is optionally included in the polyurethane polymers and prepolymers of this invention to assist dispersion of the polymer/prepolymer in water. Typically, this is done by incorporating a compound bearing at least one hydrophilic group or a group that can be made hydrophilic (e.g., by chemical modifications such as salt formation) into the polymer/prepolymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number of at least 10 mgKOH/g, preferably at least 12 and more preferred at least 14 mgKOH/g. The acid number should not exceed 200 mgKOH/g, preferably it should be less than 130, and more preferred less than 60 mgKOH/g. The most preferred acid number is at least 16 mgKOH/g and less that 40 mgKOH/g. In one embodiment, it is desired that the water dispersability enhancing component is ionic in nature and the amount of nonionic type of dispersability enhancing additive (e.g., polyalkylene oxide) and oligomers thereof is less than 5 wt. %, more desirably less than 3 wt. %, and preferably less than 1 wt. % of the flame retardant urethane additive (based on the urethane portion of the additive, i.e., not including plasticizer, fibers, other non-brominated or non-urethane polymers etc.).

Water dispersability enhancing compounds of the ionic type of particular interest are those which can incorporate carboxyl groups into the prepolymer. Normally, they are derived from hydroxy-carboxylic acids having the general formula (HO)xQ(COOH)y, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, and the like, and mixtures thereof. Dihydroxy-carboxylic acids are more preferred with dimethylolproanoic acid (DMPA) and dimethylol butanoic acid (DMBA) being most preferred.

Other water-dispersability enhancing compounds can also be reacted into the prepolymer backbone including lateral or terminal hydrophilic ethylene oxide or ureido units.

Water-dispersability enhancing compounds of the non-ionic type of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

Water dispersability enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of amines include N-methyldiethanol amine and aminoalcohols available from Huntsman under Jeffcat® trade name such as DPA, ZF-10, Z-110, ZR-50, N-methyl-bis-(3-aminopopyl) amine, and alike. They can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate. Cationic nature can be imparted by other post-polymerization reactions such as, for example, reaction of epoxy quaternary ammonium compounds with carboxylic group of DMPA.

Other suitable water-dispersability enhancing compounds include thioglycolic acid, 2,6-dihydroxybenzoic acid, sulfoisophthalic acid, polyethylene glycol, and the like, and mixtures thereof.

Although the use of water-dispersability enhancing compounds is preferred, dispersions of the present inventions can be prepared without them by using high-shear dispersing methods and stabilizing by surfactants.

Active-Hydrogen Containing Compounds

The term "active-hydrogen containing" refers to compounds that are a source of active hydrogen and can react with isocyanate groups via the following reaction:

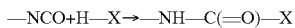

—NCO+H—X→—NH—C(=O)—X

Such compounds typically range widely in molecular weight from 18 g/mol for water to about 10,000 g/mol. They are customary divided into two subclasses depending on their molecular weight: Polyols with number-average molecular weight from about 500 to 10,000 g/mol and chain extenders with molecular weight from 18 to 500 g/mol. The divider of the scale represent physical reality: High-molecular-weight polyols contribute to the soft segment and short chain extenders contribute to the hard segment of polyurethane; however, the exact position of the divider is somewhat arbitrary and can be moved depending on the circumstances. Both classes are reviewed below in more detail.

Polyols

The term "polyol" in the context of the present invention means any high molecular weight product ($M_n$>500 g/mol), typically referred to as a long-chain polyol, which has an active hydrogen that can be reacted with isocyanates and includes materials having an average of about two or more hydroxyl or other NCO-reactive groups per molecule.

Such long-chain polyols include polyether, polyester, polycarbonate and polycaprolactone polyols. Other examples include polyamide, polyester amide, polyacetal, polythioether, polysiloxane, ethoxylated polysiloxane, halogenated polyester and polyether, polybutadiene, hydrogenated polybutadiene, polyisoprene, polyisobutylene, alkyd-modified and polythioether polyols, hydroxyl-containing acrylic and methacrylic polymers and copolymers, hydroxyl-containing epoxies, and the like, and mixtures thereof. Combinations of different types of polyols may be used. The polyether polyols, polyester polyols and polycarbonate polyols are preferred.

Polyether polyols are obtained in known manner by reaction of starting compounds that contain reactive hydrogen atoms, such as water or the diols set forth for preparing the polyester polyols, with alkylene oxides, such as ethylene oxide, propylene oxide, butylene oxide, styrene oxide, tetrahydrofuran, epichlorohydrin, and mixtures thereof. Preferred polyethers include polytetrahydrofuran (PTHF) and polypropylene glycol) (PPG). Examples include Terathane® PTHF polyols from from Invista and Acclaim™ PPG diols with lower monol contents from Arco Chemical.

The polyester polyols typically are esterification products prepared by the reaction of organic polycarboxylic acids or their anhydrides with a stoichiometric excess of a diol. Examples of suitable polyols for use in the reaction include polyglycol adipates, polyethylene terephthalate polyols, polycaprolactone polyols, orthophthalic polyols, sulfonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcyclohexane), 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, polyether glycols, halogenated diols, and the like, and mixtures thereof. Preferred diols include ethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

The preferred polyester polyol is a diol. Preferred polyester diols include hexane diol neopentyl glycol adipic acid polyester diol, e.g., Piothane 67-3000HNA (Panolam Industries) and Piothane 67-1000HNA; as well as propylene glycol maleic anyhydride adipic acid polyester diols, e.g., Piothane 50-1000OPMA; and hexane diol neopentyl glycol fumaric acid polyester diols, e.g., Piothane 67-500HNF. Other preferred polyester diols include Rucoflex™ S1015-35, S1040-35, and S-1040-110 (RUCO Polymer Corp.).

Polycarbonates

Polycarbonates include those obtained from the reaction of diols such 1,3-propanediol, 1,4-butanediol, 1,6-hexanediol, diethylene glycol, triethylene glycol, tetraethylene glycol, and the like, and mixtures thereof with diarylcarbonates such as diphenylcarbonate or phosgene.

Polysiloxane Polyols

Polysiloxane polyols are characterized by the presence of the —$R_1R_2$SiO-repeat units. Examples include ethoxylated poly(dimethylsiloxane) (PDMS) Y-17256 from Momentive Performance Materials and side-chain PDMS diol MCR-C61 from Gelest.

Polyacetals

Polyacetals include the compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6-hexanediol, and the like. Polyacetals can also be prepared by the polymerization of cyclic acetals.

Polyester Amides and Polyamides

Polyester amides and polyamides. Instead of long-chain polyols, long-chain amines may also be used to prepare the isocyanate terminated prepolymer. Suitable long-chain amines include polyester amides and polyamides, such as the predominantly linear condensates obtained from reaction of polybasic saturated and unsaturated carboxylic acids or their anyhydrides and polyvalent saturated or unsaturated aminoalcohols, diamines, polyamines, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'tris-(2-aminoethyl)ethylene diamine, N—[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, ethylene diamine, diethylene triamine, triethylene tetramine, tetraethylene pentamine, and pentaethylene hexamine, and mixtures thereof. Other suitable diamines and polyamines include Jeffamine™ D-2000 and D-4000, which are amine-terminated polypropylene glycols, differing only by molecular weight, and which are available from Huntsman Chemical Company.

Chain Extenders

Chain extenders with the molecular weight from 18 to 500 g/mol can be used during the formation of the prepolymer and during the dispersion step of the process. Because the prepolymer is formed at elevated temperatures and in the general absence of water, the less reactive alcohol functionality is preferred for the prepolymer chain extension to provide for better control over the temperature and mixing.

On the other hand, during the dispersion stage of the process, chain extenders are competing with water for the reaction with the remaining NCO. In this case, the more reactive amine functionality is preferred. For the prepolymer stage, the preferred chain extenders are the diol monomers used in making the polyester polyols described above. Any of the low-molecular-weight (less than 500 g/mol) polyols describes above may also be used as the prepolymer chain extenders.

In the most preferred embodiment of the present invention, no prepolymer chain extender is used. As a dispersion chain extender, at least one of water, inorganic or organic polyamine having an average of about 2 or more primary and/or secondary amine groups or combinations thereof is suitable for use in this invention. Suitable organic amines for use as a dispersion chain extender are the same diamines and polyamines described above as monomers for preparing polyester amides and polyamides.

Preferred amine dispersion chain extenders include ethylene diamine (EDA), diethylene triamine (DETA), triethylene tetramine (TETA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof.

Suitable inorganic amines include hydrazine, substituted hydrazines, and hydrazine reaction products, and the like, and mixtures thereof. Ammonia ($NH_3$), if used as a neutralizer during the dispersion step, can also contribute to the consumption of the remaining NCO during the dispersion stage with the formation of terminal urea.

Polyalcohols are less preferred but can be used. Examples include those having from 2 to 12 carbon atoms, preferably from 2 to 8 carbon atoms, such as ethylene glycol, diethylene glycol, neopentyl glycol, butanediols, hexanediol, and the like, and mixtures thereof.

Preferred dispersion chain extender is water. The amount of chain extenders typically ranges from about 0.3 to about 1.1 equivalents based on available isocyanate.

Branching

Branching of the ultimate polymer product, as well as the prepolymer, can be optionally accomplished for aiding tensile strength and improving chemical resistance and resistance to creep—that is, recovery to that of or near its original length after stretching. In this regard, see U.S. Pat. No. 6,897,281. The preferred prepolymer branching monomers are trimethylolpropane and glycerol. The preferred dispersion branching monomers are diethylene triamine (DETA) and triethylene tetramine (TETA).

Crosslinkers

Compounds having at least one crosslinkable functional group can also be incorporated into the polyurethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include thioglycolic acid, 2,6-dihydroxybenzoic acid, melamine and its derivatives, multivalent metal compounds, aziridines, carbodiimides, and the like, and mixtures thereof.

The amount of optional compounds having crosslinkable functional groups in the prepolymer will typically be up to about 1 milliequivalent, preferably from about 0.05 to about 0.5 milliequivalent, and more preferably from about 0.1 to about 0.3 milliequivalent per gram of final polyurethane on a dry weight basis.

Catalysts

Urethane prepolymer may be formed without the use of a catalyst but catalysis may be employed in some instances to reduce synthesis time or temperature. Examples of catalysts include organo-tin compounds, tertiary amines and transition metal compounds. Specific examples of suitable catalysts include stannous octoate, dibutyl tin dilaurate, and tertiary amine compounds such as triethylamine and bis-(dimethylaminoethyl) ether, morpholine compounds such as beta,beta-dimorpholinodiethyl ether, bismuth carboxylates, zinc bismuth carboxylates, iron (III) chloride, potassium octoate, potassium acetate and zirconium catalysts K-KAT®XC-9213 and K-KAT®6212 from King Industries.

The preferred catalysts are DABCO® (diazabicyclo [2.2.2]octane), from Air Products, a mixture of 2-ethylhexanoic acid and stannous octoate, e.g., FASCAT® 2003 from Elf Atochem North America., JEFFCAT® DPA from Hunstman, and K-KAT XC-9213 from King Industries.

The preferred catalysts are DABCO® (diazabicyclo [2.2.2]octane), from Air Products, a mixture of 2-ethylhexanoic acid and stannous octoate, e.g., FASCAT® 2003 from Elf Atochem North America., JEFFCAT® DPA from Hunstman, and K-KAT XC-9213 from King Industries.

Some amine catalysts can be permanently incorporated into the backbone of polyurethane. These include N-methyl diethanolamine, N-ethyl diethanolamine, methicol, N,N-Bis (2-hydroxyethyl)isonicotinamide (BIN), JEFFCAT® DPA, JEFFCAT® ZF-10, JEFFCAT® ZR-50, JEFFCAT® Z-110 from Hunstman, and the like.

The amount of catalyst used to form the prepolymer will typically be from about 5 to about 200 parts per million of the total weight of prepolymer reactants.

Isocyanate Blocking Agents

Several types of compounds can be employed as blocking (a.k.a. protecting or masking) agents. Their function is to temporarily protect isocyanate groups from undesired reactions. The main requirement for the blocking compound is for its reaction with isocyanate to be reversible. When the reaction is reversed, the isocyanate group is regenerated and is available for further reactions. The reverse reaction can be triggered by physical or chemical means, for example, by elevated temperatures, radiation, vacuum, catalysts, compounds with active hydrogen, or combinations thereof.

Examples of blocking agents include oximes, phenols, alcohols, lactams, imidazoles, pyrazoles, acids, mercaptanes, imides, secondary amines, sulfites, acetoacetates and derivatives of malonic acid. Oximes are generally preferred but can be replaced partially or in full by other blocking agents. Oximes can be represented by a general formula $CRR'=NOH$, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups. Examples of aldoximes include formaldoxime, acetaldoxime, propionaldoxime, butyraldoxime, benzaldoxime and the like. Examples of ketoximes include acetoxime, butanone oxime, cyclohexanone oxime, acetophenone oxime and the like.

Other preferred blocking agents include lactams, secondary and tertiary alcohols, pyrazoles and their mixtures. Some specific examples of other suitable blocking agents include dimethyl malonate, diethyl malonate, triazole, caprolactam, phenol and its derivatives, pyrazole, dimethylpyrazole, dibutylamine, diisopropylamine, tert-butanol, cyclohexanol, isopropanol and glycerine carbonate. Combinations of two or more blocking agents can be used if a stepwise reaction is desired, particularly mixtures of blocking agents which deblock at different temperatures.

The deblocking may occur during chain extension or during polymer drying and/or curing. Often it is preferred to use a blocking agent, which will evaporate from the polymer during drying or curing. In these cases, low molecular weight oximes such as acetoxime, butanone oxime, butyraldoxime and the like are preferred.

Plasticizers

Plasticizer can optionally be used in order to render the viscosity of the polyurethane prepolymer low enough to process it as taught in U.S. Pat. No. 6,576,702 which is incorporated herein by reference, or to prevent the prepolymer from freezing during the dispersion step. The plasticizer can be added at any time during prepolymer preparation or before the prepolymer is dispersed in water, e.g., separately or as a mixture with one or more reaction components prior to prepolymer preparation. They can also be added after the dispersion is formed.

Use of a plasticizer as a diluent serves a number of important functions. First, use of other diluents (such as NMP, acetone and the like) is avoided or reduced, together with attendant fire, pollution and toxicity hazards of such other diluents and solvents. The plasticizer is used substantially in place of such other organic diluents and solvents, and most preferably completely in place of such other organic diluents and solvents. The maximum amount of such other organic diluents and solvents typically is less than about 20 wt. %, preferably less than about 10 wt. %, more preferably less than about 5 wt. %, and most preferably is about 0 wt. % of total prepolymer weight. Furthermore, solids content of the final product is increased, since the plasticizer remains in the final product and does not require a burdensome product purification process. Addition of plasticizer enhances polyurethane film formation during subsequent processing to form articles. Moisture resistance of the polyurethanes is enhanced, since most plasticizers are hydrophobic and tend to slow hydrolysis, especially of polyester-based polyurethanes.

Plasticizers may be selected for use in this invention according to parameters such as compatibility with the particular polyurethane and desired properties of the final composition. For example, polyester plasticizers tend to be more compatible with polyester-based polyurethanes.

Reactive plasticizers can be used that react with functionality of the ingredients. For example, epoxy groups may be present in reactive plasticizers that react with other compounds such as aminated, carboxylated and hydroxylated compounds. Ethylenic unsaturated groups may be present in reactive plasticizers to react with compounds having ethylenic unsaturation or be prone to oxidative curing. Other reactive groups in plasticizers include carbonyl, hydrazide, and acetoacetoxy.

Plasticizers can also be selected to impart particular properties such as flame retardancy to the polyurethanes, or to enhance particular properties such as wetting, emulsifying, conditioning, and UV absorption in end-use applications.

The amount of plasticizers used can vary widely and can be anywhere from 1 to 200% based on prepolymer weight. Typically, at least 3% or more typically at least 5% is used.

The preferred amount is at least 7% and the most preferred amount is at least 9%. The typical upper level is 100% and more typically 60%. The preferred amount is less than 40% and the most preferred amount is at least 30%. The optimum amount of plasticizer for applications such as wood coatings, plastic coatings, textile coatings, nonwovens, paper, gloves, personal care and the like is determined by the desired viscosity of the prepolymer, and the optimum amount of plasticizer is determined according to the particular application, as is well known to those skilled in the art.

Of a particular interest are plasticizers which contribute to the FR properties. Examples of suitable flame retardant plasticizers include phosphorus-based plasticizers such as cyclic phosphates, phosphites, and phosphate esters, exemplified by Pliabrac TCP (tricresyl phosphate), Pliabrac TXP (trixylenyl phosphate), Antiblaze N (cyclic phosphate esters), Antiblaze TXP (tar acid, cresol, xylyl, phenol phosphates), and Antiblaze 524 (trixylyl phosphate) from Albright & Wilson Americas; Firemaster BZ 54 (halogenated aryl esters) from Great Lakes Chemicals; chlorinated biphenyl, 2-ethylhexyl diphenyl phosphate, isodecyl diphenyl phosphate (Santisizer® 148 from Ferro), C12-C16 alkyl diphenyl phosphate (Santisizer® 2148 from Ferro), triphenyl phosphate, cresol diphenyl phosphate, p-t-butylphenyl diphenyl phosphate, triphenyl phosphite, and the like. Other examples of phosphorus-based plasticizers include chlorinated alkyl phosphate esters such as tris-(2-chloroethyl)-phosphate, tris-(2-chloroisopropyl)-phosphate, tris-(1.3-dichloro-2-propyl)-phosphate, chloro alkyl diphosphate ester (Antiblaze 100 from Albright & Wilson Americas); alkyl phosphates and phosphites such as tributyl phosphate, triisobutyl phosphate, tri-2-ethylhexyl phosphate, and triisoctyl phosphite; other organophosphates and organophosphites such as tributoxy ethylphosphate (KP-140 from Chempoint); other phosphates and phosphonates such as chlorinated diphosphate and chlorinated polyphosphonate; and the like. Further examples include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, cetareth-5 phosphate, cetareth-10 phosphate, PPG ceteth-10 phosphate, and mixtures thereof. Mixtures of plasticizers can also be used.

Other suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex™ esters from Kalama Chemical), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl (C$_7$/C$_9$) benzyl phthalate, dimethoxyethyl phthalate, 7-(2,6,6,8-tetramethyl-4-oxa-3-oxononyl) benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% Cl, o,p-toluenesulfonamide, N-ethyl p-toluene sulfonamide, N-cyclohexyl p-toluene sulfonamide, sulfonamide-formaldehyde resin, and mixtures thereof. Other suitable plasticizers known to those skilled in the art include castor oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Suitable dibenzoate esters include those set forth heretofore as well as the preferred p-aminobenzoic acid (PABA) esters, which are known to absorb UV (ultraviolet) radiation in the UVC band or region of the spectrum.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), and the like, and mixtures thereof. Other suitable reactive plasticizers include epoxidized plasticizers, including certain monofuctional and polyfunctional glycidyl ethers such as Heloxy™ Modifier 505 (polyglycidyl ether of castor oil) and Heloxy™ Modifier 71 (dimer acid diglycidyl ether) from Shell Chemical Company, and the like, and mixtures thereof.

Surfactants

Surfactants can be used in the compositions of the present invention to facilitate the dispersion formation, enhance the colloidal and freeze-thaw stability of the resulting dispersions and improve their compatibility with a variety of additives. The selection and usage level of particular surfactants are often driven by the intended application and desired properties. The surfactants can be broadly divided into four categories: anionic, cationic, nonionic and zwitterionic.

Phosphate ester surfactants are of a particular interest because phosphorus can contribute to the FR properties of the final products. Examples include Dextrol® and Strodex® surfactants from Ashland and Polystep®, Stepfac® and Cedephos® surfactants from Stepan.

Solvents

Solvents, which are nonreactive to any significant extent in the context of the urethane-making reactions, may be used in the present invention but are not preferred because they introduce volatile organic component (VOC). The use of a solvent may be desirable to reduce the prepolymer viscosity, provide a heat sink, serve as refluxing medium and assist with film formation. Examples of solvents include substituted pyrrolidinones, amides, esters, ethers, ketoesters, ketones, glycolether-esters, hydrogenated furans, tertiary alcohols, aromatic and aliphatic hydrocarbons, chlorinated hydrocarbons, and the like, and mixtures thereof.

Specific examples include N-methyl-2-pyrrolidinone, N-ethyl-2-pyrrolidinone dimethylformamide, dimethylacetamide, acetone, methylethyl ketone, diisobutyl ketone, isobutylheptyl ketone, dimethylsulfoxide, N-methyl caprolactam, N-methyl valerolactam, ethylene glycol monomethyl ether formal, and dipropylene glycol dimethyl ether.

The amount of solvent can vary in a broad range depending on the specifics of the polymer to be produced. About 0.1 to 30 parts by weight of solvent by weight of solvent per 100 parts by weight of the prepolymer can be used.

Solvents with a higher boiling point than water generally remain with the aqueous dispersion and facilitate the coalescence of the polymer particles during drying and film formation.

In some cases, it is desirable to remove at least a portion of the solvent from the dispersion. It can be done with solvents which have a lower boiling point than water. These solvents can be removed from the dispersion by, for example, distillation, vacuum distillation, aseotropic distillation and thin-film evaporation.

Coalescents

Boiling point of coalescents is between those of solvents and plasticizers and is higher than boiling point of water. There is some overlap in these three categories and the division is somewhat artificial; in fact, solvents, coalescents and plasticizers form a continuum of boiling points. Coalescents tend to evaporate slower than water and remain with the polymer for an extended period of time facilitating film formation; however, at the end, they, like water, eventually also migrate out of the final product.

Examples of coalescent include ethylene glycol mono 2-ethylhexyl ether (EEH), dipropylene glycol monobutyl ether (DPnB), ethylene glycol monobutyl ether acetate (EBA), diethylene glycol monobutyl ether (DB), ethylene glycol monobutyl ether (EB), dipropylene glycol monomethyl ether (DPM), diethylene glycol monomethyl ether (DM).

Auxiliary FR Additives

The FR properties of the compositions of the present invention can be augmented by other FR additives which can act via several mechanisms:

Barrier effect: Formation of an insulating barrier layer on the surface which protects underlying substrate from heating. Phosphorus-containing compounds operate through this mechanism: they produce glassy barrier layers and/or also promote charring. An example of the latter is intumescent compositions. Zinc borate also promotes char formation.

Dilution effect: The spread of fire is slowed down or stopped by diluting oxygen in air with non-combustible gases such as nitrogen and water. For example, melamine, melamine cyanurate, and dicyandiamide (2-cyanoguanidine) release large quantities of nitrogen during thermal decomposition. Water is released by many inorganic fillers (see below).

Endothermic processes: Processes and reactions such as the liberation of water of crystallization and its conversion into steam lower combustion temperatures. High heat capacity of water makes it very effective in cooling the fire temperature. Metal hydroxides such as aluminum hydroxide and magnesium hydroxide are widely used as flame-retardant fillers. Their decomposition liberates water and leaves non-combustible metal oxide particles, which remain attached to the substrate. Inorganic hydrates such as calcium sulfate hydrate also release water vapors upon heating.

Free-radical chain reaction quenching: Some additives produce intermediates which trap free radicals formed in combustion process. Most halogen-containing FR compounds operate by this mechanism.

Different flame retardants operate through different mechanisms, and the inclusion of materials with more than one protective mechanism will generally be more effective than relying on a single mechanism. Some combinations of the FR additives have synergistic effect.

Synergists

FR synergists are compounds that enhance effectiveness of FR components. The desired amount of synergist(s) may be incorporated into the urethane during the prepolymer formation and/or dispersion stage. It also may be post-added into the urethane dispersion once the urethane dispersion and extension are complete. Some synergists are of the flame retardants by themselves; however, some of them do not exhibit significant flame retardant properties when used alone. When used with flame-retardant urethanes, these synergists can increase the overall effectiveness of the flame-retarding compositions.

Examples of synergistic combinations include:

Antimony compounds have a synergistic effect with halogens. They form antimony halides which shuttle the halogen atoms into the gas phase. Examples of such synergists include antimony trioxide, antimony pentoxide, and sodium antimonite.

Zinc borate has synergistic effects with aluminum or magnesium hydroxides.

The amount synergist does not need to be very high. Often as little as 5% to 10% by weight of the polymer composition is sufficient to display significant synergistic effect.

Nano FR Additives

Most FR additives can be incorporated into the compositions of the present invention in the nano sizes by the methods described in U.S. Pat. No. 7,598,315, which is incorporated herein by reference. Nano FR additives include boehmite, clay, polyhedral oligomeric silsesquioxane (POSS), melamine cyanurate, chlorinated poly(vinyl chloride), ammonium polyphosphate and other additives disclosed above. For some FR additives, reducing the particles to the nano size results in the beneficiary lowering of the trigger temperature—temperature at which the FR mechanism becomes operational.

Vinyl/Acrylic Hybrids

Ethylenically unsaturated monomers and other free radically polymerizable monomers can be polymerized by conventional free radical sources to form a vinyl and/or acrylic polymer within the polyurethane particle to form a hybrid acrylic-urethane dispersion. Vinyl polymers is a generic term for polymers derived from substantial portions of unsaturated monomers or polymers derived from those monomers. Acrylic (often considered a subset of vinyl) will refer to acrylic acid, acrylates (being esters of acrylic acid), and alkacrylates such as methacrylates and ethacrylates and polymers therefrom. Additional free-radically polymerizable material (unsaturated monomers) may be added to the vinyl or acrylic monomers to copolymerize. It is anticipated that most of the monomers (e.g. >50 wt. %, more desirably >75 wt. % and preferably >85 wt. % of the total free-radically polymerizable monomers) will be vinyl or the acrylic monomers.

The polymerization within the polyurethane particles can be done by forming the aqueous dispersions of polyurethane composite and then polymerizing additional monomers by emulsion or suspension polymerization in the presence of these dispersions. Another way of making hybrid polymers is to include ethylenically unsaturated monomers in the polyurethane prepolymer (either with the reactants to form the prepolymer and/or any time before the urethane prepolymer is dispersed) and to cause these monomer to polymerize before, during and/or after the prepolymer is dispersed in aqueous medium. In one embodiment, the weight percent of polymer(s) from vinyl monomers based on 100 parts of combined urethane and vinyl (or acrylic in narrower embodiments) will be at least 1, 5, or 10 weight percent with the complementary amount of urethane prepolymer or polymer to make 100 parts by weight total. In another embodiment In another embodiment where small amounts of urethane prepolymer or polymer are desired the urethane prepolymer or polymer is at least 0.1, 0.5, 1, 5 or 10 weight percent of the combined weight and the vinyl (or acrylic in narrower embodiments) polymer is the complementary amount.

In one approach, the ethylenically unsaturated monomers act as a diluent during prepolymer formation. When the vinyl monomers are used as a diluent for the polyurethane component then the vinyl monomers will be from about 5 or 10 weight percent to about 50 weight percent of the combined weight of the polyurethane and vinyl component (monomer or polymer, depending on whether polymerization has occurred or not). Hybrids of polyurethanes of this invention with vinyl/acrylics can be made by any of these approaches. This type of technology is taught in U.S. Pat. No. 4,644,030; U.S. Pat. No. 4,730,021; U.S. Pat. No. 5,137,961; and U.S. Pat. No. 5,371,133.

Another approach for making aqueous dispersions containing FR urethane is to form the polyurethane prepolymer and then disperse this prepolymer in an aqueous dispersion of the present invention. Alternatively, an FR prepolymer of the present invention can be dispersed into aqueous dispersion of any other polymer.

The preferred monomers are halogenated monomers, more preferred monomers are brominated monomers, and the most preferred monomers are pentabromobenzyl acrylate and dibromostyrene. Non-halogenated monomers can also be used if desired such as monomers containing nitrogen. Other non-halogenated monomers can also be used but they will detract from FR properties. Examples include methyl methacrylate, methyl acrylate, ethyl acrylate, butyl acrylate, styrene, vinyl acetate, etc.

Blends with Other Polymers

The dispersions of this invention can be combined with commercial polymers and polymer dispersions by methods well known to those skilled in the art. Such polymers and dispersions include those described in WIPO Publication WO 02/02657 A2, U.S. Pat. No. 4,920,176, U.S. Pat. No. 4,292,420, U.S. Pat. No. 6,020,438, U.S. Pat. No. 6,017,997 and a review article by D. P. Tate and T. W. Bethea, Encyclopedia of Polymer Science and Engineering, Vol. 2, p. 537, the disclosures of which are incorporated herein by reference.

Another approach for making aqueous FR dispersions is to form another polyurethane prepolymer and then disperse this prepolymer in an aqueous dispersion of the present invention. Alternatively, an FR prepolymer of the present invention can be dispersed into aqueous dispersion of any other polymer.

Miscellaneous Additives

The polyurethane prepolymer, the product polyurethanes produced therefrom, and the aqueous prepolymer particle aqueous dispersions of the present invention as described above can be made with various additional ingredients and features in accordance with known polyurethane technology. Such additives include stabilizers, defoamers, antimicrobial agents, antioxidants, rheology modifiers, antistatic agents, crosslinking agents, dispersants, pH adjusters, flow and leveling agents, colorants, fluorescent whiteners, ultraviolet absorbers and the like and the mixtures thereof. They can optionally be added as appropriate before and/or during the processing of the dispersions of this invention into finished products as is well known to those skilled in the art.

Total Solids Content

Additional benefit of the compositions of the present invention is their high solids content. In one embodiment the dispersions of this invention typically have total solids (e.g., or i.e., polyurethane solids) of at least about 20 wt. %, preferably at least about 25 wt. %, and still more preferably at least about 30, 35, or 40 wt. %.

Thermoplastic Urethane

Thermoplastic polyurethanes are made with the same components as waterborne polyurethanes (polyurethane dispersions in water) disclosed above but typically the thermoplastic polyurethanes have substantially less or no water-dispersability enhancing compound(s). In one embodiment, the flame retardant urethane is thermoplastic urethane. The technology for making and using thermoplastic polyurethanes are well known and described, for example, in U.S. Pat. No. 6,777,466 B2 and J. K. Backus et al., "Polyurethanes," in: Encyclopedia of Polymer Science and Engineering. Vol. 13, H F. Mark et al., Ed, pp. 243-303 (1988), the entire disclosure of which is incorporated herein by reference.

In another embodiment, the compositions of the present invention can be added as FR additives to TPUs or other plastics or rubber during or after their making.

Processes

Aqueous dispersions of FR polyurethane particles are made in accordance with this invention by forming the polyurethane prepolymer in the substantial absence of water and then dispersing this prepolymer in aqueous medium. This can be done in any fashion. Typically, prepolymer formation will be done by bulk or solution polymerizing the ingredients of the prepolymer.

Once the polyurethane prepolymer mixture is formed, it is dispersed in an aqueous medium to form a dispersion or a solution. Dispersing the prepolymer in aqueous medium can be done by any conventional technique, in the same way that other polyurethane prepolymers made by bulk or solution polymerization are dispersed in water. Normally, this will be done by combining the prepolymer with water with mixing. Where solution polymerization is employed, the solvent and other volatile components can optionally be distilled off from the final dispersion, if desired. Where the prepolymer includes enough water-dispersability enhancing compound (such as anionic, cationic, nonionic and/or zwitterionic monomers) to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation and less foaming.

The dispersions of this invention can be formed by dispersing the FR prepolymer in a previously formed aqueous dispersion of another polymer or polymers. In other words, the aqueous medium into which the prepolymer mixture is dispersed in accordance with the present invention can itself be a previously formed aqueous dispersion of another polymer or polymers including those made by emulsion and suspension polymerization techniques.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

Acetone process—A prepolymer is formed with or without the presence of acetone, MEK, and/or other polar solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.

Melt dispersion process—An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

Ketazine and ketimine processes—Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

Continuous process polymerization—An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

Reverse feed process—Water and optional neutralizing agent(s) and/or extender amine(s) are charged to the prepolymer under agitation. The prepolymer can be neutralized before water and/or diamine chain extender is added.

The polymers of the present invention can also be prepared by the two-prepolymer process leading to the formation of the core-shell and other morphologies as described in U.S. Pat. No. 7,582,698 which is incorporated herein by reference.

Applications

The urethane oligomers of the present invention are useful in various applications, including paper, nonwoven, textile and fiber glass sizing and coatings, automotive, adhesive, packaging and coatings applications, medical, personal care and household care items, automotive airbags, and electronics.

WORKING EXAMPLES

In order to more thoroughly describe this invention, the following working examples are provided. In these examples, the following reagents were used:
Dee Fo PI-40—defoamer from Ultra Additives
DMBA—dimethylolbutanoic acid from Fufu Group, LLC
FR-522—dibromoneopentyl glycol from ICL
FR-513—tribromoneopentanol from ICL
HDI—hexamethylene diisocyanate available as Desmodur® H from Bayer
IPDI—isophorone diisocyanate from Bayer Corporation
KP-140—tributoxyethyl phosphate
Nyacol A 1550—antimony pentoxide dispersion from Nyacol
Sancure® 20045—FR PUD available from The Lubrizol Corporation.
Sancure® 20054—FR PUD available from The Lubrizol Corporation.
TBBPA=tetrabromobisphenol A
TBPA—tetrabromophthalic anhydride
Triton X-100
Pentabromobenzyl acrylate
Dibromostyrene
Santisizer™ 148—isodecyl diphenyl phosphate from Ferro
TEA—triethylamine In addition, the following analytical and testing procedures were used in carrying out these examples:

Solids Content. Total solids were measured by Moisture/Solids Analyzer LabWare 9000™ (CEM Corporation).

pH. pH readings were taken using Acumet Basic pH Meter (Fisher Scientific).

Viscosity. Brookfield viscosity testing was performed using a Brookfield RV viscometer and spindles #3 to #6 (depending on viscosity) at 20 rpm and ambient temperature (~77° F.).

Particle Size. The particle size and size distribution of the dispersions were obtained by the following instruments: Submicron Particle Sizer AutodilutePAT Model 370 (NICOMP Particle Sizing Systems) using an intensity averaging with Gaussian distribution; Malvern Zetasizer Nano-S90 with data analysis by Zetasizer Software 6.12 and NanoTrak® particle size analyzer. Solids Content.

Isocyanate (NCO) Titration. A sample of prepolymer (.about.3 grams) is weighted in a 250-ml Erlenmeyer flask. Toluene (50 ml) and 2M dibutylamine solution in toluene (20 ml) are added and the mixture is heated on a hot plate until the prepolymer completely dissolves. The flask is filled up to 200 ml with isopropanol. Bromophenol blue indicator (6-7 drops) is added and solution is titrated with 1N HCl solution until the color changes from blue to light yellow.

Physical properties. ASTM D882 "Standard Test Method for Tensile Properties of Thin Plastic Sheeting" was adopted for this test. Samples were tested for ultimate tensile and elongation on Instron® Model 4301 retrofitted and equipped with MTS ReNew Elite Controller run by TestWorks 4 software. The gap for the jaws was set to 1 inch, and test was performed at a rate of 2 inches per minute. The peak load and strain at break were recorded for each sample. Three to six measurements were performed for each sample and average result were reported.

Molecular Weight. Molecular weight distributions were measured on the Waters gel permeation chromatograph (GPC) equipped with Waters Model 515 Pump, Alcott Model 708 autosampler and Waters Model 2410 refractive index detector held at 40° C. The GPC conditions were: temperature—40° C., column set—2× Phenogel 5u Linear (2)+50A Phenogel, 300×7.8 mm, mobile phase—tetrahydrofuran (THF) stabilized with 250 ppm butylated hydroxytoluene, flow rate—1.0 ml/min, injection volume—100 μl, sample concentration ~0.25%, and data acquisition using Waters Empower Pro Software. Approximately 0.05 gram of polymer was dissolved in 20 ml of stabilized HPLC-grade THF, filtered through a 0.45-micron polytetrafluoroethylene disposable filter (Whatman), and injected into the GPC. All samples were completely soluble in THF. The molecular weight calibration curve was established with EasiCal® polystyrene standards from Polymer Laboratories.

DIN 53438-1 Testing of combustible materials; response to ignition by a small flame.

ASTM D2863 Standard Test Method for Measuring the Minimum Oxygen Concentration to Support Candle-Like Combustion of Plastics (Oxygen Index).

ISO 4589 Plastics—Determination of burning behavior by oxygen index.

Federal Motor Vehicle Safety Standard FMVSS 302. The test is conducted inside a test chamber where the test specimen is mounted horizontally. The exposed side of the test specimen is subjected to a gas flam from underneath. The burnt distance and the time taken to burn this distance is measured during the test. The result, the burning rate, is expressed in mm/min.

NFPA 701. Standard Methods of Fire Tests for Flame Propagation of Textiles and Films (1977).

The following examples are presented to illustrate this invention.

Example 1

IPDI (410 grams), HDI (520 grams), FR-513 (645 grams) and FR-522 (315 grams) were reacted at 99-104° C. (210-220° F.) under a blanket of dry nitrogen for two hours. The reaction mixture was cooled to 170° F. (77° C.), and 180 grams Santisizer 148 and 67 grams DMBA were added with cooling. In about 10 minutes, 180 grams Santisizer 148 and 67 grams DMBA were added, and the reaction mixture was allowed to exotherm and was stirred at 93-99° C. (200-210° F.) for 1 hour to produce an NCO-terminated prepolymer. The mixture was cooled to 77-82° C. (170-180° F.), and 127 grams of TEA were added over 15 minutes with agitation. A portion (2,000 grams) of the neutralized prepolymer was added with mixing to 2,740 grams water at 32-35° C. (90-95° F.), which contained 3.2 grams of Dee Fo PI-40, over the course of about 10-15 minutes to form an aqueous dispersion of FR polyurethane prepolymer. The remaining NCO was allowed to react with water under agitation overnight thereby producing a clean (no coagulum and floc) stable aqueous dispersion of FR polyurethane having a total solids content of 42.3%, a pH of 7.3, B.V. of 26 cP, a mean diameter of particle size distribution of 73 nm (measured by NICOMP and reported as intensity-average Gaussian distribution), number-average molecular weight of 1,800 g/mol, and 33% theoretical bromine content.

Example 2

The synthesis was conducted the same way as in Example 1 except for the following ingredients and amounts were used.

| Ingredient | Weight, g |
| --- | --- |
| IPDI | 94 |
| HDI | 119 |
| FR-513 | 184 |
| FR-522 | 56 |
| DMBA | 31 |
| Santicizer 148 | 85 |
| TEA | 30 |
| Dispersed prepolymer | 405 |
| DeeFo PI-40 | 0.7 |
| Water | 550 |

The obtained clean and stable aqueous dispersion had the following properties: 42.1% total solids content, pH 7.8, 27 cP Brookfield viscosity, 79 nm mean particle size, 1,680 g/mol number-average molecular weight, and 35% theoretical bromine content.

Example 3

The synthesis was conducted the same way as in Example 1 except for the following ingredients and amounts were used.

| Ingredient | Weight, g |
| --- | --- |
| IPDI | 90 |
| HDI | 113 |
| FR-513 | 218 |
| FR-522 | 35 |
| DMBA | 30 |
| Santicizer 148 | 86 |
| TEA | 29 |
| Dispersed prepolymer | 415 |
| DeeFo PI-40 | 0.7 |
| Water | 550 |

The obtained clean and stable aqueous dispersion had the following properties: 43.8% total solids content, pH 7.7, 28 cP Brookfield viscosity, 82 nm mean particle size, 1,400 g/mol number-average molecular weight, and 37.5% theoretical bromine content.

Example 4

A 50:50 blend of the PUD from Example 1 with Sancure® 20045 and with addition of 11.6% wt. of Nyacol A 1550 antimony pentoxide synergist was coated onto 500 denier Nylon fabric at a dry coating weight of ~2.0-2.5 oz/sq. yard: product viscosity was controlled at 6000-8000 cPs, coating solids content was 48-50%, coating was applied by 3 passes with sharp knife; a crosslinker may be added to improve mechanical properties. The resulting treated fabric had clear coating, met all performance requirements and passed the NFPA 701 FR tests: there was no afterflame, char length was 4.5 inches (requirement is less than 6 inches), and there were no flaming drips. Thus, the addition of the dispersion of Example 1 produced the composition which passes vertical burn and is compliant with current regulatory standards.

Comparative Example A

When Sancure® 20045 was used alone at the same coating weight as combined polymers in experiment of Example 5, it failed the FR test: the afterflame lasted for 10 seconds resulting in a complete burn of the specimen and significant amount of flaming drips.

Example 5

Blend of the Dispersion from Example 1 with Sancure® 20054

A 25:75 blend (dry weight ratio) of the PUD from Example 1 with Sancure® 20054 was used as a binder to prepare paper from polyester fibers. The resulting paper consistently passed the FR tests before and after water soak exposure and met other performance requirements.

Comparative Example B

When Sancure® 20054 was used alone in the experiment of Example 4, it met all the performance requirements but was borderline (inconsistent) with respect to FR testing.

Example 6

IPDI (95 grams), HDI (120 grams), FR-513 (148 grams) and FR-522 (72 grams) were reacted at 99-104° C. (210-220° F.) under a blanket of dry nitrogen for two hours. The reaction mixture was cooled to 170° F. (77° C.), and 82 grams Santisizer 148 and 31 grams DMBA were added, and the reaction mixture was allowed to exotherm and was stirred at 93-99° C. (200-210° F.) for 1 hour. A solution of 29 grams pentabromobenzylacrylate in 82 grams Santisizer 148 (predissolved at 300° F. and cooled to ambient) was added. The mixture was cooled to 77-82° C. (170-180° F.), and 29 grams of TEA were added over 15 minutes with agitation. A portion (400 grams) of the neutralized prepolymer was added with mixing to 845 grams water at 32-35° C. (90-95° F.), which contained 0.7 grams of Dee Fo PI-40 and 23 grams Dextrol OC-4025, over the course of about 10-15 minutes to form an aqueous dispersion. The remaining NCO was allowed to react with water under agitation overnight thereby producing a clean (no coagulum and floc) stable aqueous dispersion of FR acrylic-urethane hybrid having a total solids content of 33.4%, a pH of 8.4 and a mean diameter of particle size distribution of 100 nm (measured by NICOMP and reported as intensity-average Gaussian distribution).

A portion (100 grams) of the resulting dispersion was treated at ambient temperature under the blanket of nitrogen with solution of 70% tBHP in 0.5 grams water and then with a solution of 0.1 gram erythorbic acid in 2 grams of water in order to initiate radical polymerization of pentabromobenzylacrylate.

Prophetic Example 7

During execution of any of the above inventive examples, in particular, Examples 1, 2 and 3, free-radically polymerizable monomers and their mixtures can be added to the prepolymer at any point of its preparation, such as before or after the prepolymer is dispersed into water. The most commonly used monomers are methyl methacrylate, ethyl acrylate, butyl acrylate, acrylonitrile, and styrene. The amount of added monomers is typically from about 5 to about 70% wt. based on the weight of the prepolymer. For example, about 20 to 50% wt of the 60:50 by wt. blend methyl methacrylate-butyl acrylate mixture can be used. Addition of small amounts of polymerization inhibitors such as BHT and blanketing of the prepolymer with the oxygen-depleted air is beneficiary to the safety and reliability of the operations. After the prepolymer diluted with monomers is dispersed into water according to the teaching of this invention, the free-radical polymerization can be imparted by the use of free-radical initiators in particular by redox combinations which allow for conducting polymerization at moderate temperatures. Traditional redox systems are based on such peroxides as tert-butyl hydroperoxide, hydrogene peroxide and sodium persulfate and such reducing agents as sodium bisulfite, erythorbic acid, sodium formaldehyde sulfoxylate, Bruggolite FF6 from Bruggemann Chemicals, tetramethyl ethylenediamine and mercaptanes. Accelerators such as iron-containing compounds can also be used.

Additional unsaturated monomers can be added any time after the prepolymer is dispersed into water. The described procedure will result in aqueous dispersions of anionic, cationic and/or nonionic vinyl-urethane hybrid with high total solids content and low viscosity.

Prophetic Example 8

Under elevated temperatures, 2 mols of FR-513 are reacted with 1 mol of HDI in the presence of optional plasticizer. The resulting oligomer will contain ~59% wt. Br and will have ~800 g/mol number-average molecular weight.

Prophetic Example 9

Using the process of Example 1, 2 mols of FR-522 and 1 mol of DMPA are reacted with 2 mols of HDI (NCO:OH=0.67) in the presence of optional plasticizer. The resulting oligomer will contain ~32% wt. Br and will have ~1,000 g/mol number-average molecular weight.

Prophetic Example 10

Using the process of Example 1, 2 mols of FR-522 and 2 mol of DMPA are reacted with 3 mols of HDI (NCO:OH=0.75) in the presence of optional plasticizer. The resulting oligomer will contain ~25% wt. Br and will have ~1,300 g/mol number-average molecular weight.

Examples 11-26

A series of 16 oligomeric FR PUDs were synthesized according to the process of Examples 1-3 but with a range of FR-513 and FR-522 contents. The dispersions were used as a binder (saturant) in making paper from cellulosic fibers for air filtration application. The base paper was dipped into the bath with dispersion so that paper became completely saturated with the given dispersion. The paper was then removed from the bath and run through a lab-scale size press, which consisted of two rolls that contacted each other at a given pressure (typically 10 to 30 psi). As the paper was rolled through the press, excess dispersion was removed from the paper. After the paper was saturated, it was dried on a steam can at a contact temperature of about 210° F. and further cured at 320° F. for one minutes. The cured paper was conditioned in constant 23° C. temperature and 50% humidity room before the testing for physical properties and FR performance. The following physical properties were evaluated and met performance requirements.

Dry tensile and elongation were measured using commercial instrument MTS Insight from MTS Systems Corporation in both machine direction (MD) and cross direction (CD) on 1×3-inch samples at a crosshead speed of 12 inches per minute. The jaw gap was 2 inches.

Wet tensile and elongation: The same test procedure was used as with dry tensile and elongation except that the samples were soaked in 0.1% Triton X-100 surfactant solution for 1 minute before testing.

Mullen Burst was measured using commercial instrument The Muller Tester by Standex Company according to TAPPI T-403-9.1 and 9.2 Procedure.

Air Permeability was measured by commercially available instrument FX 3300 Air Permeability Tester III (by TEXTEST Instrument of TEXTEST AG in Switzerland) with the 38 $cm^2$ head according to ASTM D 737. The values of pressure drop were obtained by the same instrument.

Flame resistance of treated paper was evaluated before and after water soaking.

Water soaking: 8.5×11 sheet was soaked in 1 liter DM water for 2 hours. Soaked paper was dried for 1 hour in 105° C. oven. Water soaking and drying was repeated three times with fresh water.

Vertical burn was evaluated according to TAPPI 461 procedure.

Figure 2:
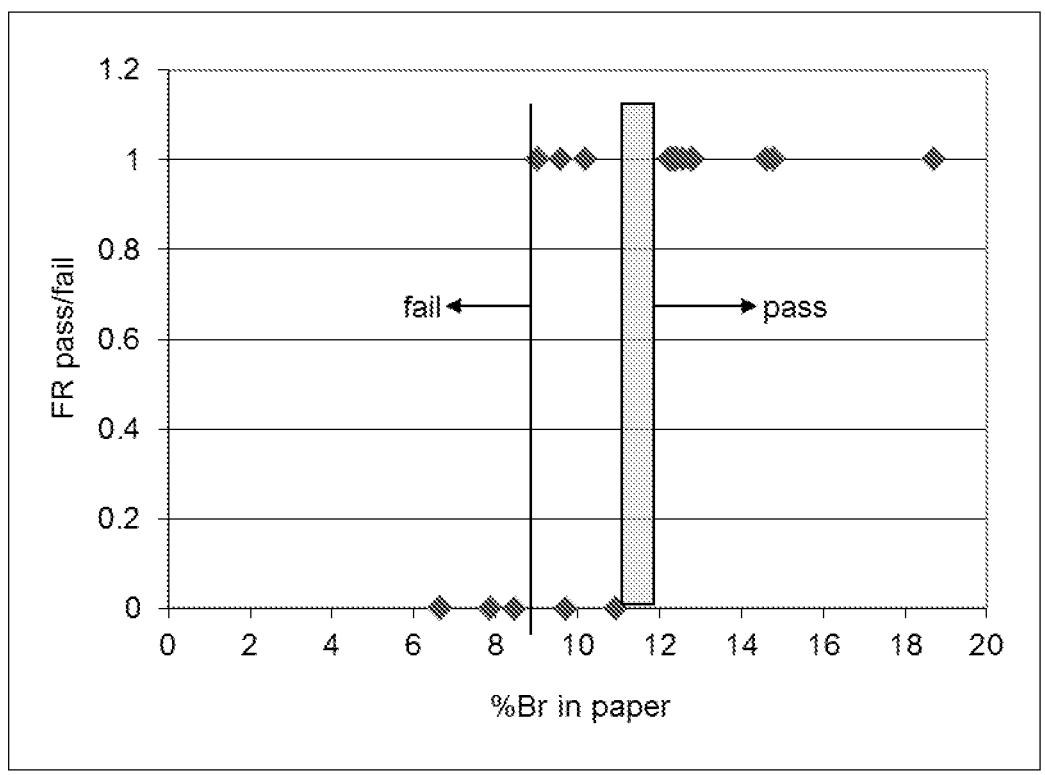
FIG. 2 shows flame retarding performance of the paper made from cellulosic fibers and the compositions of the present invention versus the total bromine content in the paper.

The results from the FR testing are summarized in FIG. 2 and show that, to pass the vertical burn test, the bromine content in the overall paper (including cellulosic fibers and other ingredients and in the absence of synergists such as compounds of antimony) should be at least 11% wt. It is obvious to those skilled in the art that this level can be decreased by introducing synergists.

Although only a few embodiments of this invention have been described above, it should be appreciated that many modifications can be made without departing from the spirit and scope of the invention. All such modifications can be included within the scope of the invention, which is to be limited only by the following claims.

The invention claimed is:

1. A flame-retardant urethane additive with the bromine content from 15% to 60% wt. and number-average molecular weight from 800 g/mol to 20,000 g/mol in the form of a dispersion in water, wherein said additive is characterized as derived from reacting one or more hydroxyl functional brominated monomers and a water-dispersability enhancing compound with an isocyanate to make a urethane flame retardant additive and wherein said one or more hydroxyl functional brominated monomers comprise tribromoneopentanol and/or dibromoneopentyl glycol.

2. A flame retardant additive according to claim 1, wherein the reactants have an NCO:OH ratio of less than 0.9/1.

3. A flame retardant additive of claim 1, further comprising a phosphate ester plasticizer.

4. A flame retardant additive of claim 3, wherein the phosphate ester is selected from the group consisting of isodecyl diphenyl phosphate, tributoxyethyl phosphate, triphenyl phosphate, and C12-C16 alkyl diphenyl phosphate.

5. A flame retardant additive of claim 1, wherein said water-dispersability enhancing compound comprises a repeat unit from an acid diol selected from the group consisting of dimethylol butanoic acid and dimethylol propanoic acid.

6. A flame retardant additive of claim 1, further comprising a second polymer selected from the group comprising acrylics, nitriles, polyurethanes, poly(vinyl chloride) and copolymers thereof, poly(vinyl acetate) and copolymers thereof, and polystyrene and copolymers thereof.

7. A flame retardant additive of claim 6, wherein said second polymer is in the form of a dispersion of polymer in water.

8. A flame retardant article comprising a flame retardant additive of claim 1 further comprising fibers selected from the group consisting of cellulosic fibers, synthetic fibers, and inorganic fibers.

9. A flame retardant article of claim 8, wherein said fibers are in the form of a woven, nonwoven or paper.

10. A flame-retardant article of claim 9, wherein the bromine content in the overall nonwoven, woven or paper composition is 11 wt. % or more based on the weight of the said nonwoven, woven or paper.

11. A flame retardant additive of claim 1, wherein said water-dispersability enhancing compound comprises repeat units from a dispersing monomer with side-chain containing ethylene oxide units.

12. A flame retardant additive of claim 1, further comprising a silicone.

13. A flame retardant additive of the above claim 12, where said silicone is NCO-reactive.

14. A flame retardant additive of claim 1, wherein the flame retardant urethane additive contains at least 20% by weight of units derived from tribromoneopentanol.

15. A flame retardant additive of claim 1, wherein the flame retardant urethane additive contains at least 20% by weight of units derived from dibromoneopentyl glycol.

16. A flame retardant additive of claim 1, wherein the flame retardant urethane contains less than 50% by weight, from non-halogenated polyol or chain extender.

17. A flame retardant article of claim 8, wherein the content of bromine in the article is at least 5 wt. %.

* * * * *